United States Patent [19]

Altmann

[11] 4,162,637
[45] Jul. 31, 1979

[54] SELF-LOCKING DIFFERENTIAL GEAR FOR MOTOR VEHICLES, ESPECIALLY BEVEL GEAR DIFFERENTIAL GEAR

[75] Inventor: Werner Altmann, Remchingen-Nöttingen, Fed. Rep. of Germany

[73] Assignee: Daimler-Benz Aktiengesellschaft, Fed. Rep. of Germany

[21] Appl. No.: 876,319

[22] Filed: Feb. 9, 1978

[30] Foreign Application Priority Data

Feb. 12, 1977 [DE] Fed. Rep. of Germany ....... 2706051

[51] Int. Cl.² .............................................. F16H 1/44
[52] U.S. Cl. .................................................... 74/711
[58] Field of Search ............................... 74/711, 710.5

[56] References Cited

U.S. PATENT DOCUMENTS

| | | | |
|---|---|---|---|
| 2,545,601 | 3/1951 | Brubaker | 74/711 |
| 2,945,400 | 7/1960 | Dupras | 74/711 |
| 3,186,258 | 6/1965 | Meldola | 74/710.5 |
| 3,397,595 | 8/1968 | Roach | 74/710.5 |
| 3,474,689 | 10/1969 | Young | 74/711 |
| 3,499,348 | 3/1970 | Hartupee | 74/710.5 |
| 3,546,968 | 12/1970 | Altmann | 74/710.5 |
| 3,973,450 | 8/1976 | Shealy | 74/710.5 |

FOREIGN PATENT DOCUMENTS 1155889  6/1969  United Kingdom ...................... 74/711

*Primary Examiner*—Lance W. Chandler
*Attorney, Agent, or Firm*—Craig and Antonelli

[57] ABSTRACT

A self-locking differential gear for motor vehicles with a rotating differential gear housing which accommodates the differential gears which in turn engage with driven gears arranged on the axle shafts; means for locking the differential gear which are coordinated to each driven gear and which are operatively connected with the driven gear are in the form of an inertia member that is rotatable and axially movable by means of a thread with respect to the driven gear against the action of return means while the inertia member is operatively connected with double-acting locking means.

26 Claims, 4 Drawing Figures

SELF-LOCKING DIFFERENTIAL GEAR FOR MOTOR VEHICLES, ESPECIALLY BEVEL GEAR DIFFERENTIAL GEAR

The present invention relates to a self-locking differential gear for motor vehicles, especially to a bevel gear differential gear, having a rotating differential gear housing or casing, which receives the differential gears, which in their turn engage with driven gears arranged on the axle shafts, whereby means for locking the differential are coordinated to each driven gear, which are operatively connected with the driven gear.

Self-locking differential gears of the aforementioned type are known as such in the art, whereby frequently cone clutches of simple construction are used as locking means. This construction and the friction occurring at the inclined surfaces may lead to difficulties during load change because, more particularly, with these single cones the movable clutch parts may remain in abutment, especially if the return springs are not sufficiently strong. In such a case, the differential gear remains locked under certain circumstances also with a load change.

The present invention is now concerned with the task of eliminating this disadvantage. Consequently, a self-locking differential gear of the double-acting type is to be proposed by the present invention, in which a disengagement of the respective cone clutches is achieved with certainty also during a load change. The underlying problems are solved according to the present invention with the differential gears of the aforementioned type in that an inertia member is coordinated to each driven gear, which is rotatable and axially movable with respect to the driven gear against the effect of return means, and in that this inertia member is operatively connected with double-acting locking means.

The construction according to the present invention offers the advantage that the locking is now released with certainty during a load change because, more particularly, the thread forcibly removes the inertia mass from engagement, i.e., the abutting cone is disengaged in every case before the counter-cone comes into abutment. Furthermore, only a still insignificant friction occurs in the thread so that the gear operates easily. The threads may be so constructed and dimensioned that they are able to cancel against the influence of the forces when driving through a curve.

A preferred embodiment of the present invention is characterized in that a double cone clutch is provided as locking means, whose axially movable clutch part is formed by the inertia member itself. Furthermore, each driven gear may be provided according to the present invention on its back side with a sleeve extension having thereon the thread, on which the axially movable clutch part acting as inertia member is arranged. It is further proposed according to the present invention that the return means are constructed in the manner of spring detents and are arranged either between this sleeve extension and the inertia member or between the inertia member and the differential gear housing. The first-mentioned possibility is characterized in that springy ball detents uniformly distributed over the circumference are arranged in each sleeve extension, whose balls cooperate with inclined abutment surfaces at the inner circumference of the inertia member. In this case, the abutment surfaces are therefore disposed in the circumferential direction and the return of the axially movable clutch part acting as inertia member then takes place by converting the back rotation by means of the thread into an axial movement.

With the last-mentioned possibility, the present invention provides that springy ball detents are or a spring ring is arranged in the axially normal symmetry plane of each double cone in one of the two cooperating parts, which cooperate respectively with axially effective abutment surfaces at the other part. Consequently, in this case the abutment surfaces act directly in the axial direction. In detail it is proposed therefor that each double cone has its largest diameter in the symmetry plane and that a circumferential groove with a spring ring is arranged at this place in the inertia member, and that in the housing the cone surfaces are constructed steeper at the corresponding place for the formation of the abutment surfaces.

Experience has demonstrated that during the forward drive, smaller acceleration forces, i.e., at best up to about 0.6 g, can be applied onto the ground than during the braking whereby already accelerations above 1.0 g could be measured. In order that the blocking action does not become effective prematurely during the braking, the present invention proposes that the abutment surfaces pointing in the forward driving direction or the abutment surfaces corresponding to the forward driving direction have a lesser inclination than the abutment surfaces pointing in the reverse driving direction or their corresponding abutment surfaces. The double cone of the two locking clutches receives according to the present invention on both sides thereof the same inclination slightly above the self-locking, preferably approximately 14°.

Accordingly, it is an object of the present invention to provide a self-locking differential gear for motor vehicles which avoids by simple means the aforementioned shortcomings and drawbacks encountered in the prior art.

Another object of the present invention resides in a self-locking differential gear for motor vehicles, especially to a bevel differential gear which is simple in construction, yet avoids with certainty continued locking during a load change.

A further object of the present invention resides in a self-locking differential gear of double-acting type in which a disengagement of the cone clutches is achieved with great reliability also during a load change.

Still a further object of the present invention resides in a self-locking differential gear for motor vehicles of the type described above which excels by ease of operation and simplicity in design as well as reliability in operation.

These and other objects, features and advantages of the present invention will become more apparent from the following description when taken in connection with the accompanying drawing which shows, for purposes of illustration only, two embodiments in accordance with the present invention, and wherein.

Figure 1:
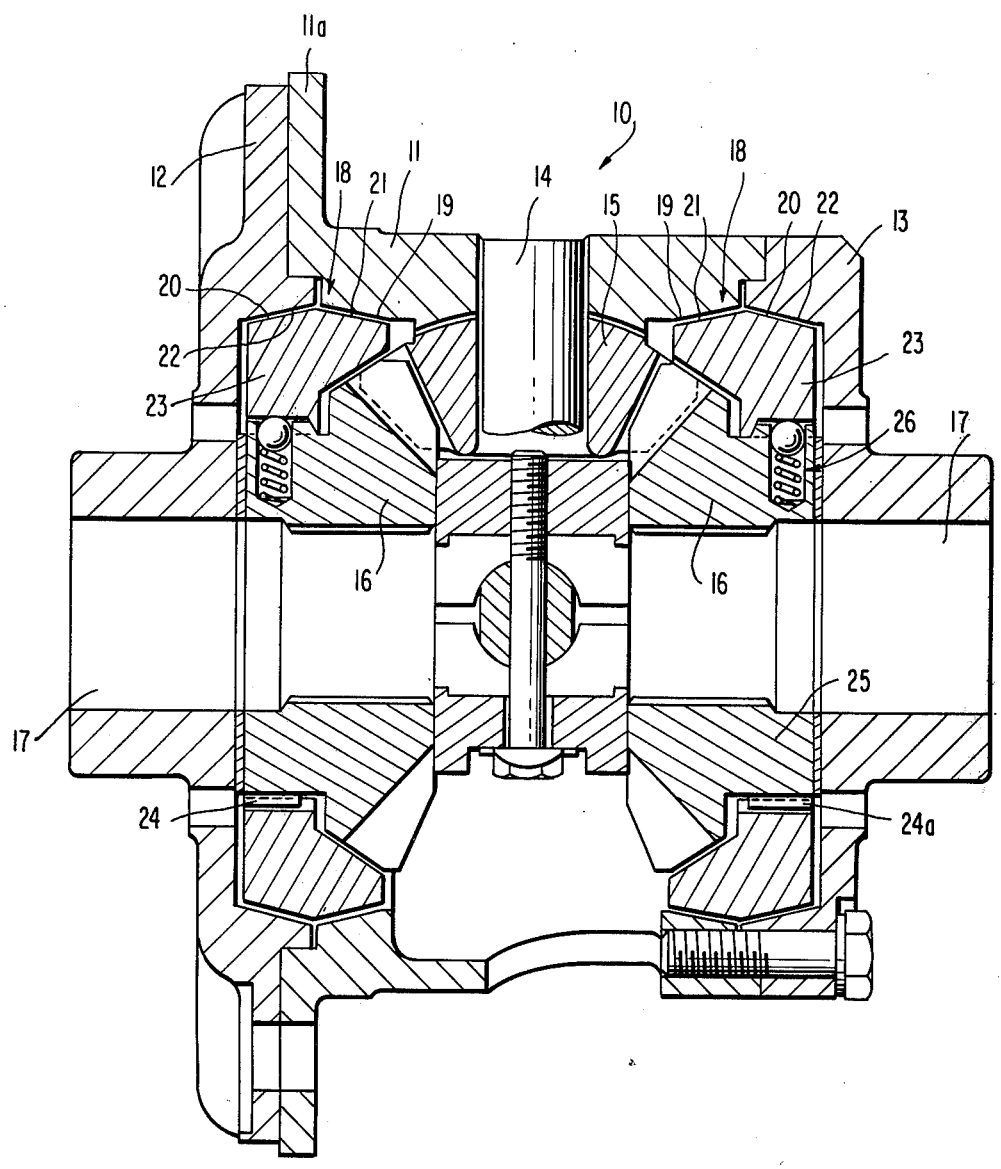
FIG. 1 is a longitudinal cross-sectional view through the differential gear casing of a self-locking differential gear in accordance with the present invention.

Referring now to the drawing wherein like reference numerals are used throughout the various views to designate like parts, and more particularly to FIG. 1, the differential gear housing or casing generally designated by reference numeral 10 consists in FIG. 1 of a center part 11 which is provided with a flange 11a and is closed off on both sides by means of one cover 12 and 13 each. The differential gear housing 10 accommodates in the customary manner the differential spider 14, on the arms of which are mounted the differential gears 15. The differential gears 15 are in meshing engagement with the output or driven gears 16 which are non-rotatably arranged on the half-axles 17.

One locking clutch each generally designated by reference numeral 18 is coordinated to each driven or output gear 16, which are constructed as double-cone clutches. Their outer cone surfaces 19 and 20 are disposed within the housing or casing whereas the inner cone surfaces 21 and 22 are provided at an axially movable clutch part 23. The outer cone surfaces 19 directed toward the spider 14 are thereby arranged in the housing center part 11 and the other outer cone surfaces 20 in the covers 12 and 13.

Each axially movable cone member 23 is provided for its effect as inertia member. A thread 24 is provided along its inner circumference, by means of which it engages with a corresponding thread 24a at a sleeve extension 25 on the back side of each driven gear 16. These threads 24 and 24a are constructed on the one side, as left-handed thread and on the other, as right-handed thread but have the same pitch. They are of such type that they again cancel the influence of the forces when driving through curves.

Three ball detents generally designated by reference numeral 26 (see FIG. 2) which are distributed uniformly over the circumference, are disposed in the sleeve extensions 25; the balls 27 of the ball detents 26 are forced outwardly by springs 28. The balls 27 cooperate with abutment surfaces 29 and 30 which are arranged at the inner circumference of the inertia member 23. These ball detents 26 in conjunction with the abutment surfaces 29 and 39 (FIG. 2) are effective as return means. The abutment surface 29 pointing in the forward direction of rotation has a lesser inclination than the abutment surface 30 corresponding to the backward direction of rotation.

In the illustrated position, both locking clutches 18 are disengaged, i.e., the movable clutch parts 23 effective as inertia member are disposed in their center position. In this condition, the differential gear is fully effective. If now one output or driven wheel 16 slips through—whereby the response threshold is determined by the ball detents—then the inertia member 23 stays back by reason of its mass inertia, i.e., the ball detents 26 run up along the abutment surface 29 and at the same time the thread guides the inertia member 23 opposite the centrifugal forces so that the movable clutch part 23 becomes stuck in the cone 19, respectively, 20. The locking clutch is thus engaged, i.e., the differential gear is blocked.

Figure 3:
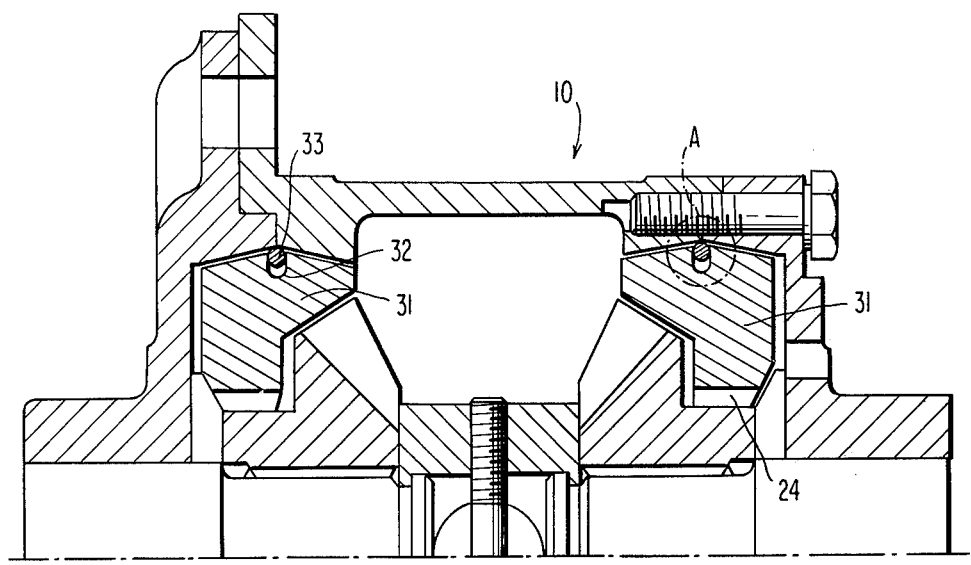
FIG. 3 is a partial longitudinal cross-sectional view through a modified embodiment of a differential gear in accordance with the present invention.
Figure 2:
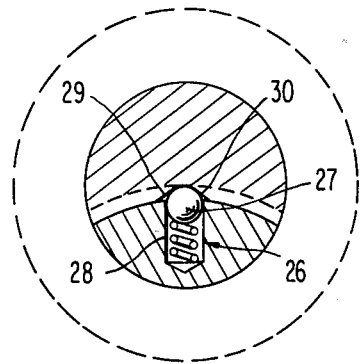
FIG. 2 is a partial transverse cross-sectional view illustrating a detail of the ball detent in the embodiment according to FIG. 1.
Figure 4:
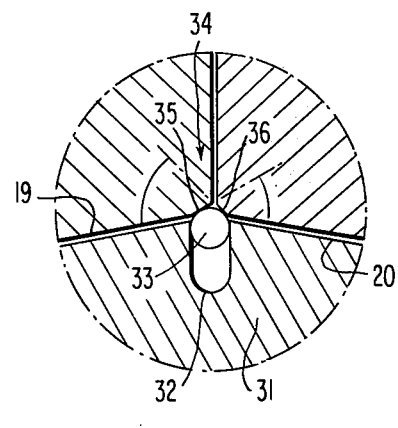
FIG. 4 is a partial longitudinal cross-sectional view, on an enlarged scale, and illustrating the detail in the dash and dot circle A of FIG. 3.

The embodiment according to FIGS. 3 and 4 corresponds in all essential parts to those according to FIGS. 1 and 2. However, the return means are now arranged externally in the inertia members. A circumferential groove 32 is located at the largest diameter of the inertia members 31, i.e., in the symmetry plane perpendicular to the axis, in which an outwardly springy or elastic spring ring 33 is arranged. This spring ring 33 engages with corresponding prestress in a further annular groove 34 provided in the housing 10 which is formed by the two abutment surfaces 35 and 36 which in contrast to the embodiment according to FIGS. 1 and 2 are not constructed as cone surfaces and therefore act directly axially. They are obtained simply in that the cone surfaces 19 and 20 provided for the locking clutch are constructed steeper at the mutually facing sides. Also in this case the inclination which corresponds to the forward direction of rotation is smaller than that of the backward direction of rotation.

The operation is, in principle, the same in the embodiment of FIGS. 3 and 4 as already described hereinabove. The axial displacement takes place when the inertia member 31 remains or stays back by way of the threads 24. The return takes place in this case directly in the axial direction by the interaction of the spring ring 33 onto the corresponding abutment surfaces 35 and 36.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A self-locking differential gear for motor vehicles, comprising a rotating differential gear housing means which accommodates differential gear means, said differential gear means operatively engaging with driven gears arranged on axle shafts, and means for locking the differential gear coordinated to each differential gear means, said locking means being operatively connected with the driven gears, characterized in that an inertia means is coordinated to each driven gear, which is rotatable and axially movable with respect to the driven gear by a thread means against the action of return means, and in that said inertia means is in operative connection with double-acting locking means.

2. A differential gear according to claim 1, characterized in that a double-cone clutch means is provided as locking means, whose axially movable clutch member is formed by the inertia means itself.

3. A differential gear according to claim 2, characterized in that each driven gear is provided on its back side with a sleeve extension having a thread means, on which is arranged the axially movable clutch member having a corresponding counter-thread means and acting as inertia means.

4. A differential gear according to claim 3, characterized in that the return means are constructed in the manner of spring detent means and are arranged either between the sleeve extension and the inertia means or between the inertia means and the differential gear housing.

5. A differential gear according to claim 4, characterized in that elastic ball detent means are arranged in each sleeve extension uniformly distributed over the circumferences, the balls of the ball detent means cooperating with inclined abutment surface means at the inner circumference of the inertia means.

6. A differential gear according to claim 4, characterized in that in the plane of symmetry perpendicular to the axis of each double-cone means, elastic means are arranged in one of the two cooperating parts, said elastic means cooperating with axially effective abutment surface means at the other part.

7. A differential gear according to claim 6, characterized in that the elastic means are elastic ball detent means.

8. A differential gear according to claim 6, characterized in that the elastic means are formed by a spring ring.

9. A differential gear according to claim 6, characterized in that each double-cone means has its largest diameter in the plane of symmetry and in that a circumferential groove with a spring ring is arranged at this place in the inertia means, and in that the cone surface means in the casing means are constructed steeper at the corresponding place for the formation of the abutment surface means.

10. A differential gear according to claim 9, characterized in that the abutment surface means corresponding to or pointing in the forward driving direction have a lesser inclination than the abutment surface means pointing in the backward driving direction.

11. A differential gear according to claim 10, characterized in that the double-cone means has on both sides a similar inclination slightly above self-locking.

12. A differential gear according to claim 11, characterized in that said inclination is about 14°.

13. A differential gear according to claim 5, characterized in that the abutment surface means corresponding to or pointing in the forward driving direction have a lesser inclination than the abutment surface means pointing in the backward driving direction.

14. A differential gear according to claim 13, characterized in that the double-cone means has on both sides a similar inclination slightly above self-locking.

15. A differential gear according to claim 14, characterized in that said inclination is about 14°.

16. A differential gear according to claim 1, characterized in that each driven gear is provided on its back side with a sleeve extension having a thread means, on which is arranged the axially movable clutch member having a corresponding counter-thread means and acting as inertia means.

17. A differential gear according to claim 1, characterized in that the return means are constructed in the manner of spring detent means and are arranged between the sleeve extension and the inertia means.

18. A differential gear according to claim 1, characterized in that the return means are constructed in the manner of spring detent means and are arranged between the inertia means and the differential gear housing means.

19. A differential gear according to claim 16, characterized in that elastic ball detent means are arranged in each sleeve extension uniformly distributed over the circumferences, the balls of the ball detent means cooperating with inclined abutment surface means at the inner circumference of the inertia means.

20. A differential gear according to claim 1, characterized in that in the plane of symmetry perpendicular to the axis of each double-cone means, elastic means are arranged in one of the two cooperating parts, said elastic means coperating with axially effective abutment surface means at the other part.

21. A differential gear according to claim 20, characterized in that the elastic means are elastic ball detent means.

22. A differential gear according to claim 20, characterized in that the elastic means are formed by a spring ring.

23. A differential gear according to claim 20, characterized in that each double-cone means has its largest diameter in the plane of symmetry and in that a circumferential groove with a spring ring is arranged at this place in the inertia means, and in that the cone surface means in the casing means are constructed steeper at the corresponding place for the formation of the abutment surface means.

24. A differential gear according to claim 20, characterized in that abutment surface means corresponding to or pointing in the forward driving direction have a lesser inclination than the abutment surface means pointing in the backward driving direction.

25. A differential gear according to claim 2, characterized in that the double-cone means has on both sides a similar inclination slightly above self-locking.

26. A differential gear according to claim 25, characterized in that said inclination is about 14°.

* * * * *